Aug. 16, 1960  D. L. EIDSON ET AL  2,949,124
PROPORTIONING MECHANISM
Filed Dec. 21, 1955  3 Sheets-Sheet 1

INVENTORS.
Dennis L. Eidson
Jay N. Swarr
By: Olson & Trexler attys.

Aug. 16, 1960 D. L. EIDSON ET AL 2,949,124
PROPORTIONING MECHANISM
Filed Dec. 21, 1955 3 Sheets-Sheet 2

INVENTORS.
Dennis L. Eidson
Jay N. Swarr
By: Olson & Trexler
attys.

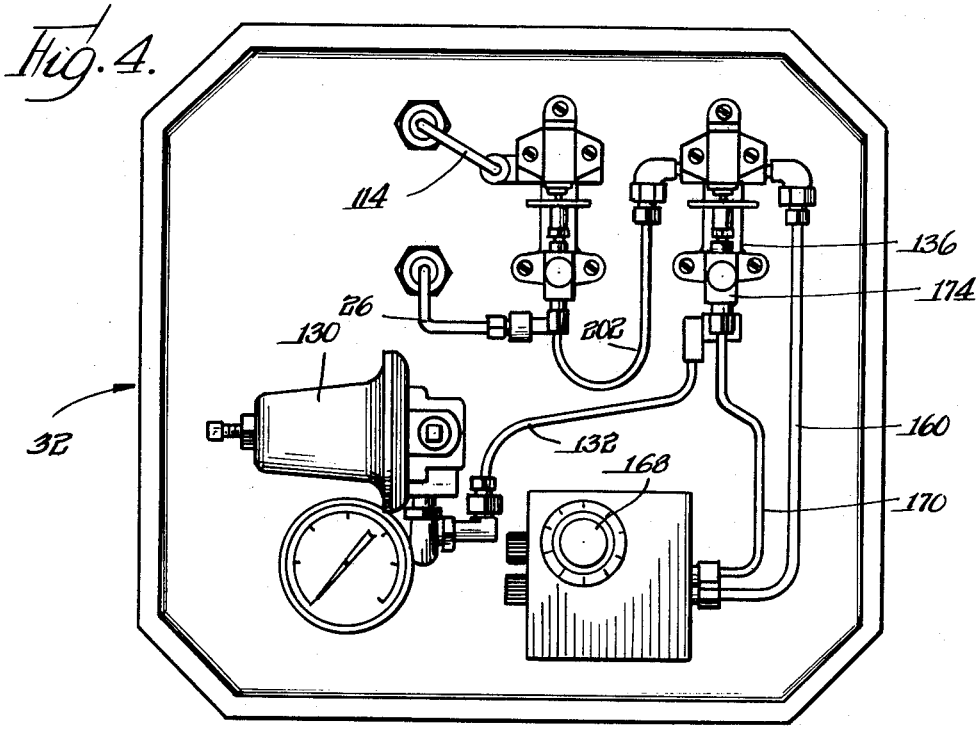
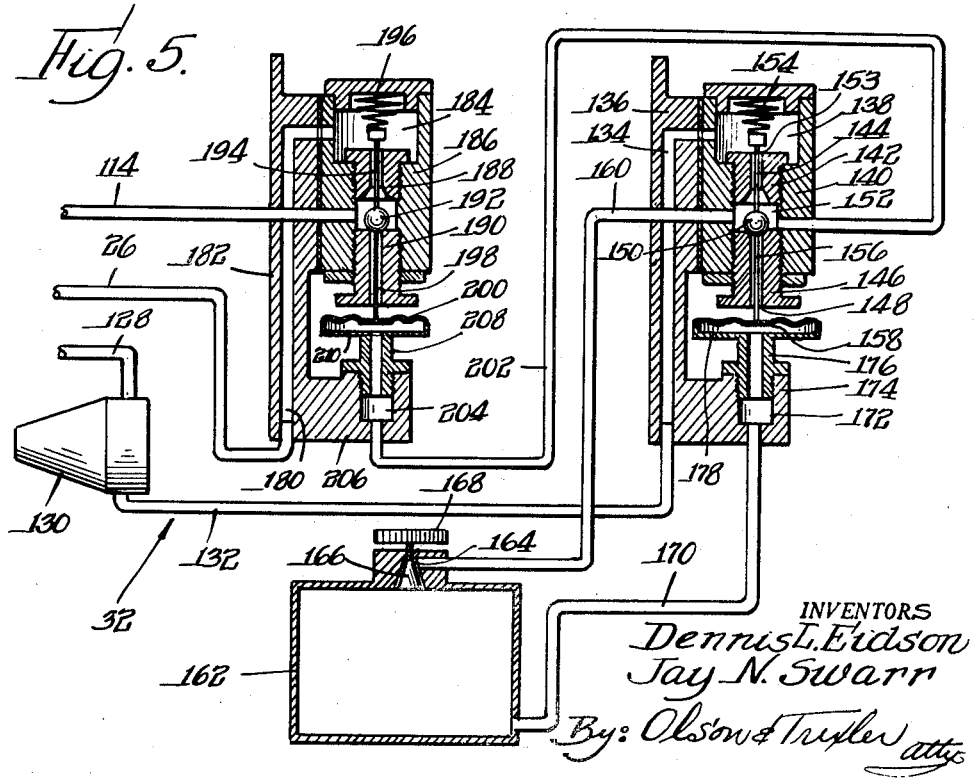

United States Patent Office

2,949,124
Patented Aug. 16, 1960

2,949,124

PROPORTIONING MECHANISM

Dennis L. Eidson, Oak Park, and Jay N. Swarr, Elmhurst, Ill., assignors to Hills-McCanna Company, Chicago, Ill., a corporation of Illinois Filed Dec. 21, 1955, Ser. No. 554,475

8 Claims. (Cl. 137—99)

The present invention relates to a novel proportioning apparatus, and more particularly to a novel apparatus for controlling the rates of fluid flow through one line in accordance with the rate of fluid flow through another line.

There are many processes in which it is desired to provide a controlled proportional flow of fluid through different lines, such, for example, as a process wherein a fluid is to be discharged from one line into another fluid flowing through another line so that the two fluids are mixed together in a predetermined ratio. While many different fluid mixing or flow proportioning processes may be advantageously effected by the apparatus of the present invention, the apparatus is especially useful for introducing an odorizing fluid into a natural gas line or main and the invention will be described with particular reference to this use in order to facilitate the disclosure.

As will be understood odorizing fluids have long been introduced into natural gas mains in order to warn a consumer of the occurrence of a gas leak. It is highly desirable for the odorizing fluid and gas to be mixed uniformly and in substantially predetermined proportions. The odorizing fluid is usually expensive and highly toxic so that it is undesirable to introduce too much of it into the gas, and if too little of the fluid is introduced into the gas the odor will be insufficient to give proper warning of a gas leak. As will be understood, the rate of gas flow in a main may vary considerably in accordance with the demands of the consumers and the desired proportion of the odorizing fluid to the gas is quite small and may be on the order of three parts per million. Thus, the apparatus for supplying the odorizing fluid should be capable of delivering relatively small and accurately controlled amounts of fluid which amounts should be variable in accordance with the rate of gas flow through the gas main. For example, a typical installation requires that the apparatus be capable of delivering between zero and one gallon of odorizing fluid per hour. Furthermore, for safety reasons, the apparatus for delivering the odorizing fluid may not include and electrical or other means which might create a spark and thereby cause an explosion. While various apparatus have heretofore been suggested and used for supplying an odorizing fluid into a gas line, such prior apparatus have not been able consistently to satisfy all the requirements outlined above.

An important object of the present invention is to provide a novel apparatus which is capable of drawing fluid through one line at a rate which is substantially uniformly proportional to the rate of fluid or gas flow through another line regardless of variations, within the limits of the apparatus, of the last mentioned flow rate.

A more specific object of the present invention is to provide a novel apparatus capable of consistently introducing controlled amounts of a fluid into a fluid or gas line in accordance with the rate of fluid or gas flow through said line so that the resulting mixture will have a substantially predetermined and constant ratio.

Another more specific object of the present invention is to provide a novel apparatus for delivering or pumping a fluid into a pressurized fluid or gas line to provide a mixture having a predetermined ratio, which apparatus is controlled and actuated entirely by fluid or gas supplied thereto, preferably from said gas line.

Another object of the present invention is to provide a novel apparatus of the above described type which is capable of accurately delivering a fluid at relative low rates approaching zero gallons per hour as well as at substantially high rates in accordance with the rate of fluid or gas flow through a line to provide a mixture in said line having a substantially predetermined ratio regardless of the rate of fluid or gas flow therethrough, within the limits of the apparatus.

A more specific object of the present invention is to provide a novel apparatus of the above described type which may be adjusted so as to change the ratio of the mixture ultimately provided in the fluid or gas line.

Other objects and advantages of the present invention will become apparent from the following description and the accompanying drawings, wherein:

Fig. 4 is an enlarged view taken along line 4—4 in Fig. 2; and

Fig. 5 is a diagrammatical sectional view of the portion of the apparatus shown in Fig. 4.

Figure 1:
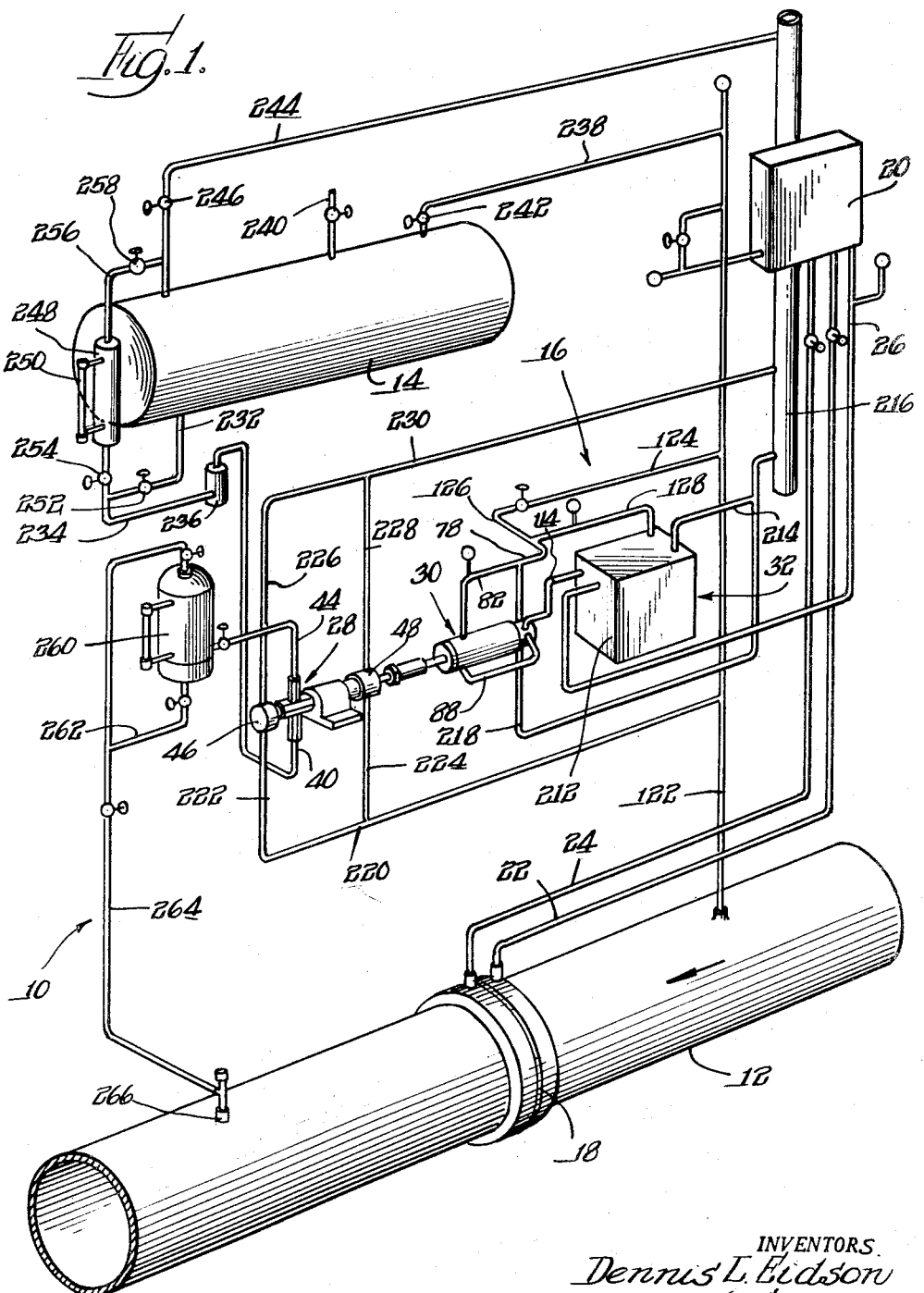
Fig. 1 is a diagrammatic view showing an installation incorporating the novel apparatus of the present invention.

Referring now more specifically to the drawings wherein like parts are designated by the same numerals throughout the various figures, an installation 10 including the features of the present invention is diagrammatically shown in Fig. 1. The installation comprises a main fluid or gas line 12 through which fluid or gas under pressure flows in the direction of the arrow. As will be understood the rate of fluid flow through this line will vary in accordance with the demands of the consumers. The installation also includes a tank 14 for a fluid which is to be introduced into the line 12, which fluid may, for example, be ethyl mercaptan when it is to be introduced into a natural gas line for odorizing purposes. Apparatus 16 is provided for pumping the fluid from the tank 14 and into the line 12, which apparatus is adapted to be actuated and controlled by fluid or gas under pressure so that the fluid or odorant from the tank 14 and the fluid or gas in the line 12 are mixed in predetermined portions which are substantially fixed regardless of variations in the rate of gas flow through the line 12, within the limits of the apparatus.

An orifice plate 18 or the like is mounted in the gas line 12, and a flow controller or pressure regulating device 20 is connected with the line 12 at upstream and downstream sides of the orifice plate by conduits 22 and 24, respectively. The flow controller 20 supplies gas or fluid under pressure to a conduit 26 connected therewith which pressure varies in accordance with the rate of fluid or gas flow through the line 12. While the pressure differential between the conduits 22 and 24 varies substantially as the square of the rate of gas or fluid flow through the line 12, the pressure of the gas supplied to the conduit 26 varies lineally with respect to the rate of gas flow through the line 12. Flow controllers capable of accomplishing this result are of known construction and are commercially available and therefore the controller 20 need not be described in detail. The fluid under pressure or pressure signal supplied to the conduit 26 is utilized in the apparatus 16 in the manner described below.

Included in the apparatus 16 are a piston pump 28, a fluid or pneumatically operated positioner or pump actuator 30 and a pneumatic oscillator or timer 32 for controlling the actuator. The pump 28 comprises an open ended cylindrical body 34 and a piston 36 reciprocable therein. An inlet check valve assembly 38 is connected between the pump body and a fluid inlet conduit 40, and an outlet check valve assembly 42 is connected between the pump body and an outlet conduit 44. Opposite ends of the pump body are substantially sealed by packing assemblies 46 and 48.

Figure 2:
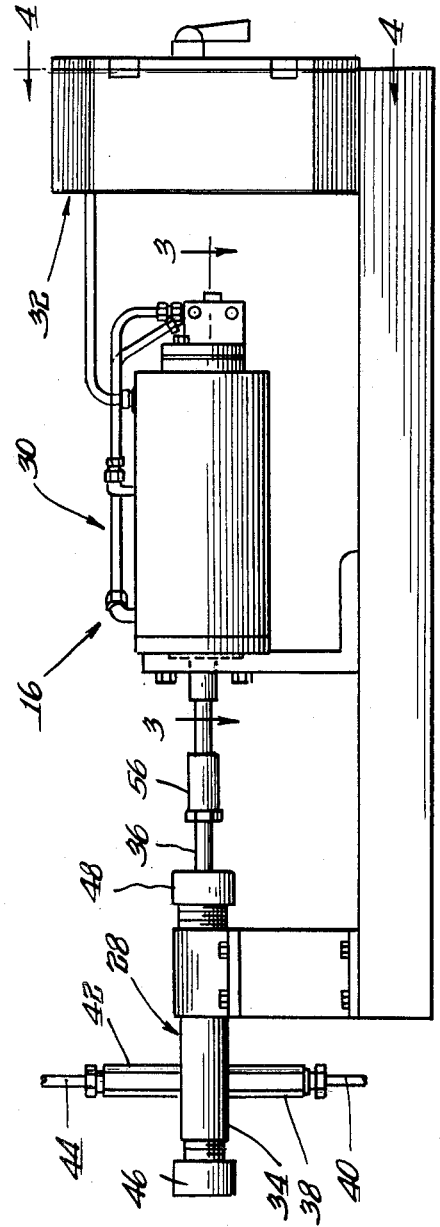
Fig. 2 is an elevational view showing a portion of the novel apparatus of this invention.
Figure 3:
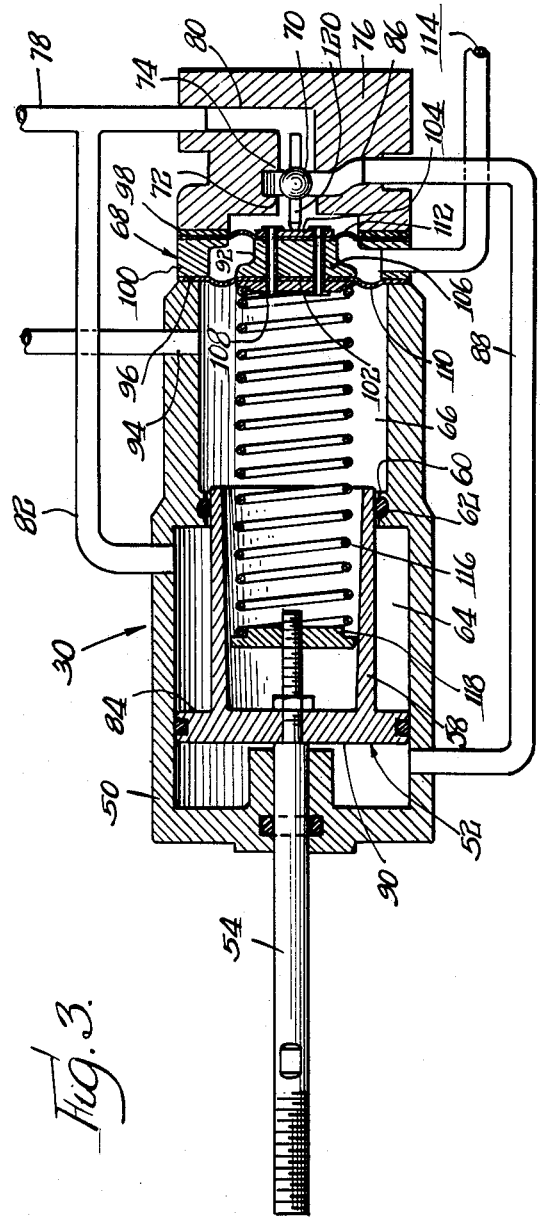
Fig. 3 is an enlarged fragmentary sectional view taken along line 3—3 in Fig. 2.

As shown best in Figs. 2 and 3, the pump actuator 30 comprises a cylinder 50 having a piston 52 reciprocable therein. A rod 54 is connected with the piston 52 and is also connected with the pump piston by an axially adjustable coupling 56. The piston is provided with a rearwardly projecting sleeve portion 58 which extends through an internal flange 60 in the cylinder and cooperates with an O-ring 62 or other sealing device to seal a pressure chamber 64 at the forward end of the cylinder from a vent chamber 66 at the rear end of the cylinder.

Fluid or gas under pressure is supplied in a manner described fully hereinbelow for reciprocating the piston 52, and in order to control the operation of the piston a pressure sensitive or pressure signal responsive device 68 is secured to the rear end of the cylinder for operating a valve 70 between valve seats 72 and 74 in a valve block 76. More specifically, piston operating fluid or gas under pressure is supplied from a power conduit 78 to a passageway 80 in the valve block 76 and also to a branch conduit 82 which directs a portion of the gas into the pressure chamber 64 behind the back side 84 of the piston 52. The valve passageway 80 communicates with the valve seats 72 and 74 as does another passageway 86, which last mentioned passageway is connected by a tube 88 with the forward end of the pressure chamber 64 in front of the forward side 90 of the piston 52. It will be seen that when the ball valve 70 is disposed toward the seat 72, fluid under pressure will flow through the passageways 80 and 86 and through the tube 88 into the forward end of the pressure chamber 64. Since the effective area of the forward surface 90 of the piston is substantially greater than the effective area of the back side 84 the piston will be moved rearwardly. However, when the valve 70 is shifted toward the seat 74 the forward end of the pressure chamber 64 is connected by the tube 88 and the passageway 86 and passageways 92 through the device 68 with the vent chamber 66 which in turn is vented to the atmosphere by a port 94. This enables the gas pressure acting upon the side 84 of the piston to move the piston forwardly.

The signal responsive device 68 comprises a pair of flexible diaphragms 96 and 98 having their peripheral portions spaced by an annular member 100 and clamped between the cylinder and the valve block. Mid portions of the diaphragms are rigidly interconnected and retained against flexing by opposite end plate members 102 and 104 and an intermediate spacing member 106. These members are connected by hollow rivets 108 which provide the above mentioned passageways 92. It should be noted that the diaphragm retaining and clamping members are constructed so that the diaphragm 96 is provided with a free flexible portion 110 which has a substantially greater diameter and area than a similar portion 112 of the diaphragm 98. The free flexible portions of the diaphragms define a chamber into which a pressure signal may be introduced through a tube or conduit 114. A compression spring 116 acts between the diaphragm assembly and a washer 118 adjustably mounted on the piston rod 54. A pin 120 extends from the ball valve 70 for engagement with the plate member 104 of the diaphragm assembly.

With the actuator structure described above, the spring 116 normally biases the diaphragm assembly rearwardly so that the valve 70 is shifted toward the valve seat 74 whereby the forward end of the piston chamber is connected with the vent chamber and the piston is retained in the forward position. Then when fluid under pressure or a pressure signal is transmitted through the conduit 114 to the diaphragm assembly, the pressure acts upon the diaphragm portions 110 and 112 and the diaphragm assembly is shifted forwardly against the action of the spring 116 as a result of the larger area of the diaphragm portion 110. When this occurs the pressure in the passageway 80 causes the ball valve 70 to shift forwardly toward the valve seat 72 a distance permitted by the forward movement of the diaphragm assembly whereby fluid under pressure is admitted to the forward end of the piston chamber and the piston 52 is shifted rearwardly against the action of the spring 116 and the pressure applied to the piston surface 84. It will be appreciated that as the piston 52 moves rearwardly the spring is compressed and this action continues until the force of the spring overcomes the effect of the pressure within the diaphragm assembly and shifts the diaphragm assembly rearwardly to move the valve 70 back toward the seat 74. Thus, the length of the piston stroke and therefore the length of the pump stroke is determined by the force required to shift the diaphragm assembly rearwardly, whereby the length of the stroke may be varied by varying the pressure or magnitude of the pressure signal supplied to the diaphragm assembly. The pressure signal transmitting conduit 114 is intermittently connected with the outlet conduit 26 of the flow controller in the manner described below so that the magnitude of the pressure signal and thus the length of the piston stroke is directly proportional to the rate of gas flow through the line 12.

The pneumatic oscillator or timer 32 is constructed so as to control the frequency with which the pressure impulses or signals are supplied to the signal responsive means 68 of the pump actuator. More specifically, the pneumatic oscillator is constructed so that the frequency may be predetermined and maintained at a substantially constant value so that after the oscillator has been adjusted and the frequency determined, variations in the output of the pump 28 are provided by variations in the length of the piston stroke. Since, as mentioned above, the variations of the length of the piston stroke are directly proportional to the rate of fluid flow through the line 12, the output of the pump will also be directly proportional to the rate of fluid flow through the line 12.

To accomplish the results outlined in the preceding paragraph, the oscillator 32 is connected with a suitable source of fluid or gas under pressure, which in the present installation is preferably the main gas line 12. As shown in Fig. 1, a pressure conduit 122 is connected with the line 12, which conduit is connected by branch conduits 124 and 126 with an oscillator supply conduit 128. Preferably the gas power conduit 78 for the pump actuator is also connected with the power conduit 122 through these branch conduits.

As shown in Figs. 4 and 5, the gas supply conduit 128 enters a pressure regulator 130 in the oscillator unit, which pressure regulator supplies a substantially constant pressure to a tube 132. The tube 132 is connected with the passageway 134 in a body member 136, which passageway in turn communicates with a chamber 138 in a valve body 140. An inlet valve seat member 142 having a passageway 144 therethrough is disposed in the valve body member, and a similar vent valve seat member 146 having a vent passageway 148 therethrough is disposed in the body member in opposing relationship with respect to the valve seat member 144. A ball valve 150 is disposed in a space 152 between the valve seat members and is adapted alternately to engage the seat members.

A pin 153 connected with the ball valve extends through the passageway 144 and is acted upon by a compression spring 154 for normally biasing the ball valve so as to close the vent passageway. A similar pin 156 extends through the vent passageway and is adapted to be engaged and actuated by a flexible diaphragm 158 in the manner described below to shift the ball valve against the inlet seat member 142.

A tube 160 is connected with the valve body 140 and communicates with the space between the valve seats. An opposite end of the tube 160 is connected with a fixed volume chamber 162 through a restricted orifice 164. A needle valve 166 is disposed in the orifice for controlling the effective size thereof, which needle valve is connected with a knob 168 by which the valve may be readily adjusted. The chamber 162 is also connected by a tube 170 with a passageway 172 in a body member 174 which receives a hollow stem 176 of a diaphragm supporting member 178. The diaphragm 158 is constructed so as to resist flexing until substantially a predetermined pressure has been established in the chamber between the diaphragm 158 and the member 178 whereupon the diaphragm flexes and expands rapidly suddenly to shift the ball valve 150 from the seat 146 against the seat 142. Similarly the diaphragm 158 is constructed so that when the pressure applied thereto begins to diminish the diaphragm resists flexing until pressure has been reduced a predetermined amount whereupon the diaphragm flexes rapidly so as to permit the ball valve 150 to shift suddenly back against the seat member 146.

By way of example the above described portion of the pneumatic oscillator 32 functions alternately to establish relatively high and low pressures and thereby create pressure signals in the following manner. The ball valve in this portion of the pneumatic system is initially maintained in the position shown in Fig. 5 so that when fluid or gas under pressure is introduced into the system it flows through the pipe 132, past the ball valve and into the tube 160. As will be understood, the fluid pressure in the tube 160 is substantially identical to the pressure of the fluid supplied from the reducing valve 130 so that a relatively high pressure is established in the fluid passageway or tube 160. The fluid leaks relatively slowly through the restricted orifice 164 and into the chamber 162 so that the pressure within the chamber 162 and therefore the pressure in the tube 170 and the diaphragm chamber builds up relatively slowly. As this pressure builds up, there is a small deflection of the diaphragm 158 which is essentially linear with respect to the pressure and at a predetermined pressure, for example about 6 p.s.i., a slight further increase in the pressure will cause a sudden large increase in the deflection of the diaphragm for shifting the ball valve to open the vent and close the inlet seat 142. When the vent is open the pressure in the tube or passageway 160 substantially instantaneously drops to atmospheric pressure and the fluid in the chamber 162 begins to pass slowly through the restricted orifice to the vent so that the pressure applied to the diaphragm slowly decreases. As this occurs, the deflection of the diaphragm will decrease slightly and substantially lineally with respect to the decrease in pressure until a predetermined pressure, for example about 5.7 p.s.i., is reached at which point a further decrease in the pressure permits a sudden large decrease in the diaphragm deflection so that the ball valve is shifted rapidly back against the vent seat. When the vent seat is closed a relatively high pressure is again and substantially instantaneously established in the tube 160. It will be understood that this cycle will continue indefinitely and that its frequency will be substantially constant and fixed by the rate at which the gas may pass through the restricted orifice 164. This rate may be adjusted by rotating the knob 168 to adjust needle valve 166.

In order to control the pressure signal supplied to the pump actuator, the pressure conduit 26 is directed to the oscillator unit and is connected with a passageway 180 in a body member 182. The passageway 180 communicates with a chamber 184 in a valve body 186 having an inlet valve seat 188 and a vent valve seat 190 disposed in spaced opposing relationship therein. The signal transmitting conduit 114 is connected with the valve chamber between these valve seats, and a ball valve 192 is provided for alternately engaging these seats. A pin 194 connected with the ball valve 192 extends through a passageway in the inlet seat member and is acted upon by a compression spring 196 for normally biasing the ball valve against the vent seat. Another pin 198 extends through the vent passageway for engagement with the diaphragm 200 capable of being deflected to shift the ball valve from the vent seat to the inlet seat. In order to actuate the diaphragm 200 a tube 202 has one end connected with the valve chamber 152 in the valve 140 and an opposite end connected with a passageway 204 in a body member 206 which communicates with a hollow stem 208 of a diaphragm supporting member 210. Thus, the relatively high and low pressures which are alternately established in the passageway or chamber 152 at a predetermined frequency in the manner described above are also established in the tube 202 and the chamber between the diaphragm 200 and its supporting member. A substantially square wave of pressure is therefore applied to the diaphragm 200 which has substantially lineal deflection characeristics so that the ball valve 192 is shifted back and forth with sudden motions and at the same frequency as the ball valve 150. It will be appreciated that when the ball valve 192 is sealed against the vent member a pressure signal will be supplied from the conduit 26 to the transmitting conduit 114, and that when the ball valve is shifted against the inlet seat the conduit 114 will be vented to terminate the pressure signal.

In order to prevent the atmosphere surrounding the installation from becoming contaminated with gas and odorizing fluid, the oscillating unit is preferably disposed within a sealed housing 212 as shown in Fig. 1, and gas escaping into the housing from the vent members 146 and 190 is carried by a vent conduit 214 to a flare stack 216. In addition the vent port 94 of the pump actuator 30 is connected with the flare stack by a vent conduit 218. Also there is a possibility that portions of the odorizing fluid may leak into the packing assemblies 46 and 48 of the pump, and therefore these packing assemblies include lantern rings and are continuously flushed with gas which may be directed from the conduit 122 through a conduit 220 and branch conduits 222 and 224. Vent conduits 226 and 228 are connected to the packing assemblies 46 and 48, respectively, and to a vent manifold 230 which in turn is connected to the flare stack.

Preferably the tank 14 is placed under gas pressure during operation of the installation so that the odorizing fluid is fed to the pump through conduit 232, 234, a filter 236 and the above mentioned inlet conduit 40 under pressure. Gas under pressure may be conveniently supplied to the tank 14 from the conduit 122 through a branch conduit 238. The tank 14 is provided with a filling conduit 240 having a normally closed shut off valve therein, and during the filling operation a shut off valve 242 in the gas pressure conduit 238 may be closed and a gas within the tank may be vented to the flare stack through a conduit 244 having a normally closed shut off valve 246 therein.

During initial adjustment of the apparatus, a small tank 248 having a calibrated sight glass 250 is filled with the odorizing fluid for supplying the pump so that the actual rate at which the odorant is pumped can be observed. During such adjustment of the apparatus a shut off valve 252 in the conduit 232 is closed and a shut off valve 254 in the conduit 234 is opened. The tank 248 is provided with a vent conduit 256 having a normally closed shut off valve 258 therein extending from its upper end.

The pump outlet conduit 44 may be connected directly with the gas line 12 or with a spray nozzle disposed within the gas line, but in the embodiment shown the conduit 44 is connected with a small tank or accumulator 260. The accumulator 260 has an outlet connected by conduits 262 and 264 with a nozzle member 266 within the gas line 12. An advantage of this arrangement is that the odorant flows substantially continuously into the gas line 12 rather than in spurts as it would if the line 44 were connected directly with the gas line 12.

While the preferred embodiment of the present invention has been shown and described herein, it is obvious that many structural details may be changed without departing from the spirit and scope of the appended claims.

The invention is claimed as follows:

1. A fluid operated control apparatus comprising means operable in accordance with fluid pressure signals supplied thereto, means supplying fluid under pressure, fluid passageway means connected with said supply means, valve means connected in said passageway means for alternately venting said passageway means and establishing communication between said passageway means and supply means so that fluid pressure in said passageway means is alternately decreased and increased to provide pressure signals, signal transmitting means energized by said signals operatively connected between said passageway means and said first mentioned means, and fluid operated means connected with said supply means and operable by fluid supplied therefrom for providing additional fluid pressure signals for actuating said valve means at a predetermined frequency.

2. A fluid operated control apparatus comprising means operable in accordance with fluid pressure signals supplied thereto, means for supplying fluid under pressure, a substantially sealed fluid system connected with said supply means, valve means for alternately venting said system and establishing communication between said system and said supply means so as to increase and decrease the fluid pressure in said system to provide pressure signals, said system including flexible means and fluid flow restricting means between said flexible means and said valve means for actuating said valve means at a predetermined frequency, and signal transmitting means energized by said signals operatively connected between said system and said first mentioned means.

3. An apparatus for proportioning fluid flow through first and second fluid lines in accordance with the volume of fluid flow through said first line comprising pump means connected in said second line, means connected with said first line for supplying fluid from said first line at pressures directly proportional to the volume of fluid flow through said first line, and means connected with said fluid supply means and using fluid from said supply means and operatively connected with said pump means for providing intermittent fluid pressure signals varying in magnitude in accordance with the pressures of the fluid from said supply means and substantially constant in frequency for controlling the output rate of said pump means.

4. An apparatus for proportioning rates of fluid flow through first and second lines in accordance with the volume of fluid flow through said first line comprising pump means connected in said second line, means connected with said first line for supplying a relatively small amount of fluid from said first line at pressures substantially directly proportional to the volume of fluid flow through said first line, and fluid means including valve means connected between said supplying means and said pump means for providing fluid pressure signals for controlling operation of said pump means, and additional means connected with said first line for providing additional fluid pressure signals for actuating said valve means at a predetermined frequency.

5. An apparatus for proportioning the rate of fluid flow through first and second lines in accordance with the volume of fluid flow through said first line comprising pump means connected in said second line, means connected with said first line for supplying fluid from said first line at pressures proportional to the volume of fluid flow through said first line, and fluid means connected with said supplying means and using fluid from said supplying means and operatively connected with said pump means for providing intermittent fluid pressure signals at a substantially constant frequency and of magnitudes varying in accordance with the pressure of the fluid from said supply means for controlling and varying the output rate of said pump.

6. An apparatus for pumping a fluid through one line in accordance with the rate of flow of gas under pressure through a second line comprising pump means connected in said one line, means connectable with said second line for supplying gas under pressure therefrom and including means for adjusting the pressure of the gas supplied therefrom substantially lineally in accordance with any adjustments of the rate of gas flow through said second line, pneumatic pump actuating means connected with said pump and including means responsive to gas pressure signals for controlling operation of said pump actuating means, means including valve means for alternately venting said pressure signal responsive means and connecting said pressure signal responsive means with said gas supplying means, and pneumatic means operatively communicating with said second line and operatively connected with said valve means for periodically providing another fluid pressure signal for actuating said valve means at a predetermined substantially constant frequency.

7. An apparatus for pumping fluid through one line in accordance with the rate of flow of gas through a second line comprising pump means connected in said first line, pneumatic pump actuating means connected with said pump means and including pneumatically reciprocable means and means responsive to fluid pressure signals for controlling the rate of reciprocation of said reciprocable means in accordance with the frequency of said signals and for controlling the length of stroke of said reciprocable means in accordance with the pressure of said signals, means connected with said second line for supplying gas under a pressure substantially directly proportional to rates of gas flow through said second line, means including valve means for alternately venting said pressure signal responsive means and connecting said pressure signal responsive means to said gas supply means, and pneumatic means operatively communicating with said second line and operatively connected with said valve means for actuating said valve means at a predetermined substantially constant frequency.

8. An apparatus for introducing an odorizing fluid or the like into a line carrying a gas such as natural gas or the like comprising variable displacement piston pump means for pumping the fluid into said line, gas supply means connectable with said line and including means for substantially linearly varying gas pressure supplied thereby in accordance with variations in the rate of gas flow through said line, pneumatic means including a reciprocable member connected with said pump for actuating said pump, means for supplying gas under pressure from said line to said pneumatic means for actuating said reciprocable member, said pneumatic means including fluid pressure means responsive to pressure signals for controlling the rate and stroke of operation of said reciprocable member, means including valve means for alternately venting said pressure signal responsive means and connecting said pressure signal responsive means with said supply means, and pneumatic means operatively communicating with said line for alternately and substantially instantaneously establishing relatively high and relatively low pressures at a substantially constant frequency and for actuating said valve means in accordance with said alternating pressures.

References Cited in the file of this patent

UNITED STATES PATENTS

| | | |
|---|---|---|
| 1,829,907 | McCornack | Nov. 3, 1931 |
| 2,080,872 | Paterson | May 18, 1937 |
| 2,374,437 | Kerry | Apr. 24, 1945 |
| 2,413,029 | McFarland | Dec. 24, 1946 |

FOREIGN PATENTS

| | | |
|---|---|---|
| 370,842 | Great Britain | Apr. 14, 1932 |